Oct. 11, 1960      E. SCHWERTL      2,955,701
TRAY FOR COOLING AND PROOFING BAKERY PRODUCTS
Filed Nov. 12, 1957      3 Sheets-Sheet 1

INVENTOR.
EDWARD SCHWERTL
BY
ATTORNEY

Oct. 11, 1960 E. SCHWERTL 2,955,701
TRAY FOR COOLING AND PROOFING BAKERY PRODUCTS
Filed Nov. 12, 1957 3 Sheets-Sheet 2

INVENTOR.
EDWARD SCHWERTL
BY
ATTORNEY

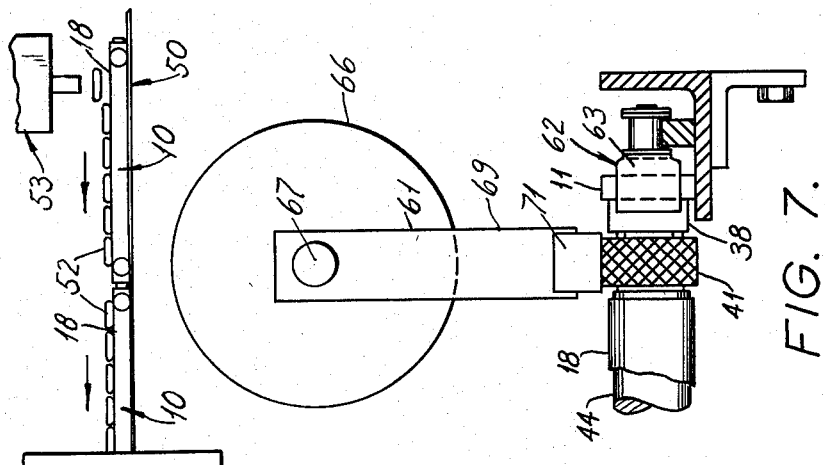
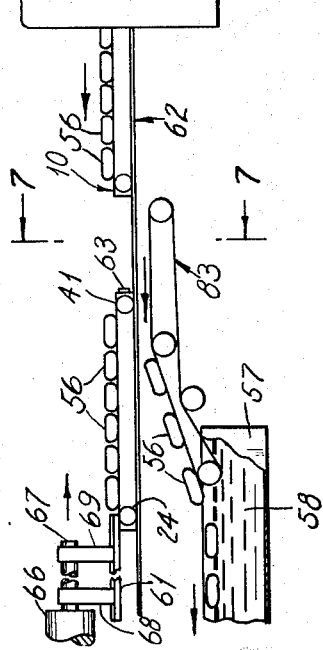
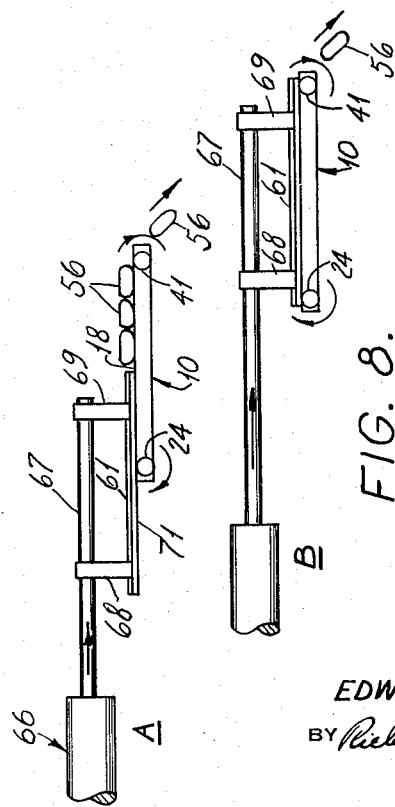

United States Patent Office 2,955,701
Patented Oct. 11, 1960

2,955,701

TRAY FOR COOLING AND PROOFING BAKERY PRODUCTS

Edward Schwertl, New Hyde Park, N.Y., assignor to Joe Lowe Corporation, New York, N.Y., a corporation of Delaware Filed Nov. 12, 1957, Ser. No. 695,666

3 Claims. (Cl. 198—203)

The present invention relates generally to a baker's tray or screen, and it has particular relation to improvements in such trays or screens in which they are not only reversible but have built-in mechanism for automatic unloading.

There are many different kinds of baker's trays or screens on the market, but most of them are nothing more than a large flat pan into which a plurality of raw dough pieces may be deposited for proofing or baked products may be deposited for cooling. Such trays or screens are made generally of a substantially uniform size for use interchangeably with other trays on standard conveyor operations. The aforementioned trays or screens have no built-in automatic features for unloading their contents, and which must be removed either manually or by dumping the entire tray to discharge the contents thereof.

An object of the present invention is to provide an automatic reversible baker's tray or screen that may be used interchangeably with conventional trays or screens for proofing or cooling of bakery products, and, while it has novel built-in automatic features for unloading, it is of a simple, durable and inexpensive construction.

Another object of the invention is the provision of a baker's tray or screen that is light in weight, strong and rigid, and has built-in features for automatically unloading its contents.

A further object of the invention is to provide a simple, durable and inexpensive automatic unloading baker's tray or screen that is reversible in every respect, having no top or bottom or front or back, requiring specific positioning on a conveyor in order to utilize its automatic unloading features.

Another object of the invention is to provide a simple, efficient and inexpensive unloading baker's tray or screen that will operate from either side of a conveyor on which it may be traveling.

Other and further objects and advantages of the invention, which result in simplicity, economy and efficiency, will be apparent from the following detailed description, reference being had to the accompanying drawings, forming a part hereof wherein like numerals indicate like parts, in which:

Figure 6 is a fragmentary diagrammatic elevational view, partly in section, illustrating the automatic features of a tray embodying the principles of the invention, the same being used in a continuous doughnut operation;

Figure 7 is an enlarged fragmentary elevational view of the tray shown in Figure 6, the same having been taken substantially along the line 7—7 thereof; and Figure 8 consists of two views A and B on an enlarged scale of the air driven unit, showing its piston arm, which carries a camming bar adapted to engage the knurled wheel which turns the belt to unload its charge of products thereon.

Figure 1:
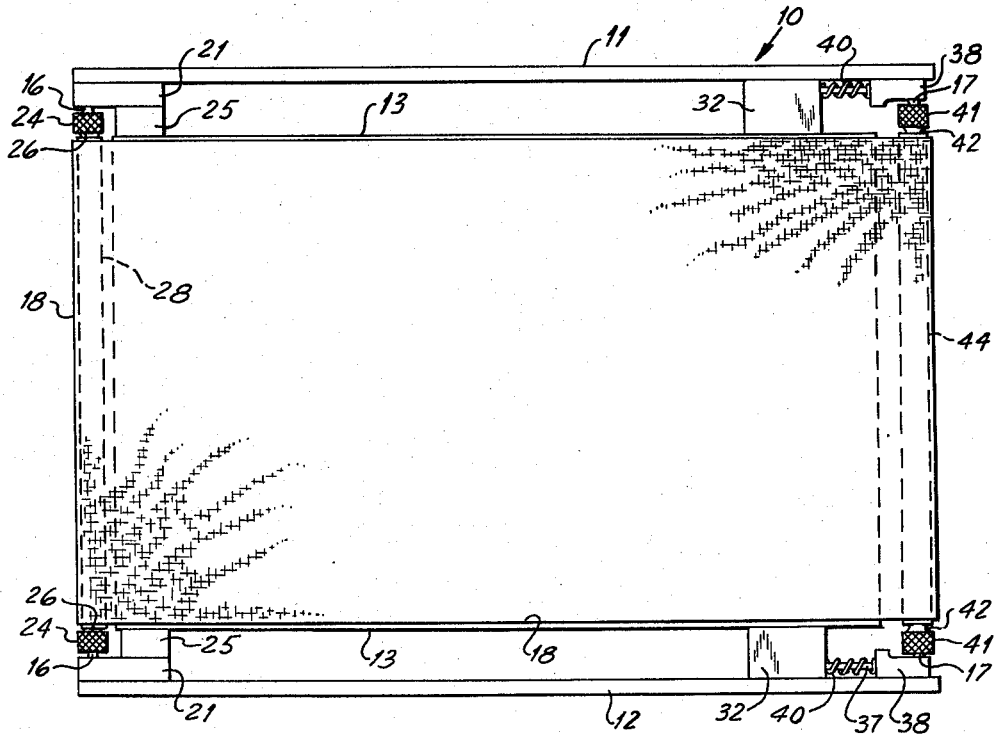
Figure 1 is a top plan view of a baker's tray or screen embodying the principles of the invention.

Referring now to the drawings, there is shown in Figure 1 a baker's tray or screen 10 constructed in accordance with the principles of the invention, having a main frame structure consisting of spaced side rails 11 and 12, having an intermediate hollow belt supporting platform 13. The tray or screen 10 is preferably made of aluminum, but it may be made of any other light weight material such as magnesium, plastic, wood and the like.

Mounted on each end of the side rails 11 and 12 are idler shafts 16 and 17. The shaft 16 is mounted in a fixed position, but the shaft 17 is movable longitudinally of the tray in order to maintain its endless encircling belt 18 in a taut position at all times. The endless belt 18 may be made of any suitable material, such as fabric, neoprene, etc., which is sanitary and will permit easy cleaning. The manner in which the ends of the belt material may be joined are not shown since any conventional method may be used without departing from the spirit of the invention.

Figure 5:
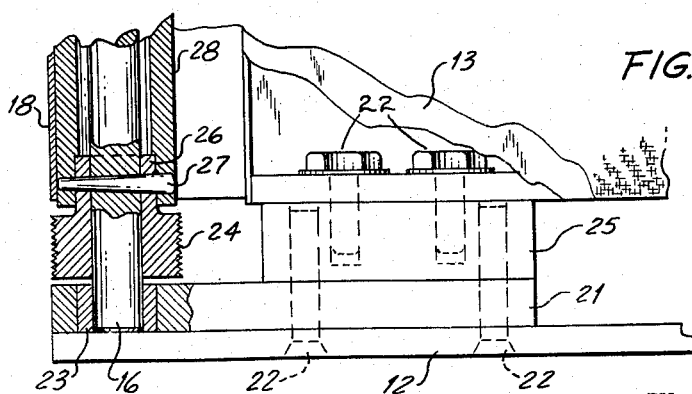
Figure 5 is a fragmentary sectional view, on the same scale as Figure 4, showing the details of construction of one of the corners at the opposite end of the tray or screen.

Referring now to Figure 5, there is shown one manner in which the idler shaft 16 may be mounted between the side rails 11 and 12. In this construction, the idler shaft 16 is mounted in a fixed position in bearing blocks 21, which are secured fixedly to the sides of the rails 11 and 12 by bolts 22. The shaft 16 is suitably journalled in bearings 23. A second spacing block 25 is also secured to the side rails 11 and 12 by bolts 22, which serves as means for mounting the hollow belt supporting member 13 to the frame structure in any conventional manner (not shown). A knurled wheel 24, having an integrally formed inwardly extending reduced portion or boss 26, is mounted fixedly on each end of the shaft 16 by means of a key 27. The wheel 24 is spaced inwardly from the bearing block 21 for the sake of clearance. A tubular sleeve 28 is mounted over the shaft 16 between the opposed bosses 26 with a snug fit, and is secured fixedly to the bosses 26 by the key 27. The tubular sleeve 28, in combination with the shaft 16, bearing blocks 21, etc. provides suitable means, which for convenience will be hereinafter collectively referred to as a "roller" suitable for mounting one end of the endless belt 18.

Figure 4:
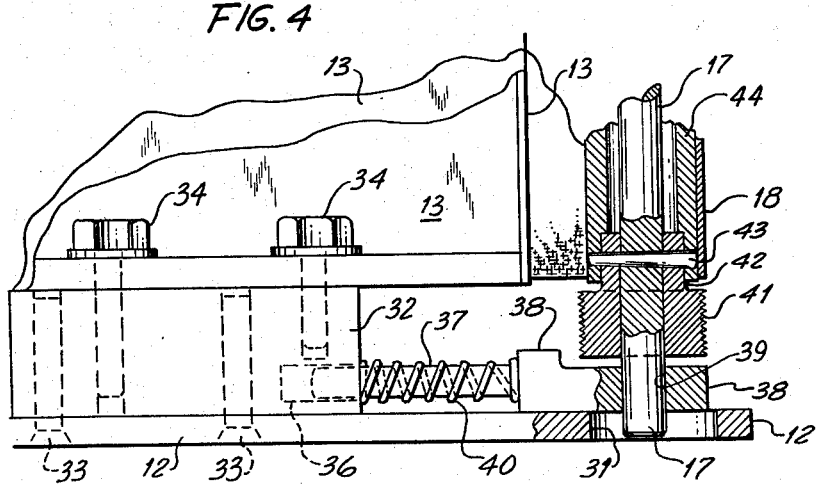
Figure 4 is a further enlarged fragmentary sectional view, of one corner of the tray or screen, showing its construction in further detail and showing the means employed for maintaining the endless belt in a taut arrangement over its spaced idler rollers.

Referring now to Figure 4, there is shown another way in which the idler rollers may be mounted between the side rails 11 and 12. In this construction, each end of the idler shaft 17 is mounted in longitudinally extending slots 31 in each of the side rails 11 and 12, the slots of each rail being in transverse alignment. A mounting block 32 is secured oppositely and inwardly on each of the side rails 11 and 12 by means of bolts 33. The blocks 32 are also secured fixedly to the adjacent sides of the hollow belt supporting platform 13 by means of bolts 34. The blocks 32 have a recessed opening extending longitudinally thereof in parallel relation to the side rails 11 and 12, as indicated at 36, which opening is adapted to receive one end of a supporting rod 37 that has a bearing block 38 extending longitudinally of its outer free end, which block 38 has a transverse opening 39 therethrough for receiving the shaft 17. Mounted on the supporting rod 37 between the block 32 and the block 38 is a coil spring 40, which has sufficient spring urging pressure outwardly and away from the block 32 to maintain the belt 18 that encircles the rollers of the idler shafts 16 and 17 taut at all times within normal operating limits of the slots 31.

The shaft 17 also has a knurled wheel 41 mounted fixedly adjacent each of the bearing blocks 38, which also has an integrally formed inwardly extending reduced portion or boss 42 keyed to said shaft 17 by means of the key 43. A tubular sleeve 44 is mounted over the shaft 17 between the opposed bosses 42 with a snug fit. The sleeve 44 is also fixedly mounted on and between the aligned bosses 42 by the keys 43. The sleeve 44 serves as a mounting roller for one end of the endless belt 16.

Figure 2:
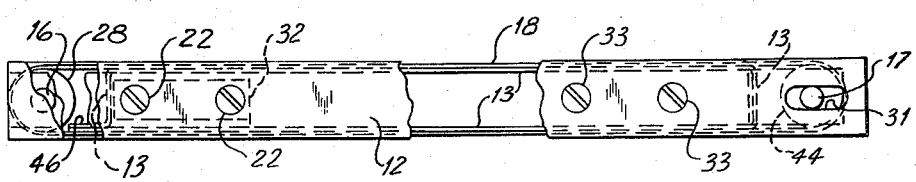
Figure 2 is a side elevational view, with parts broken away, of the tray or screen shown in Figure 1.
Figure 3:
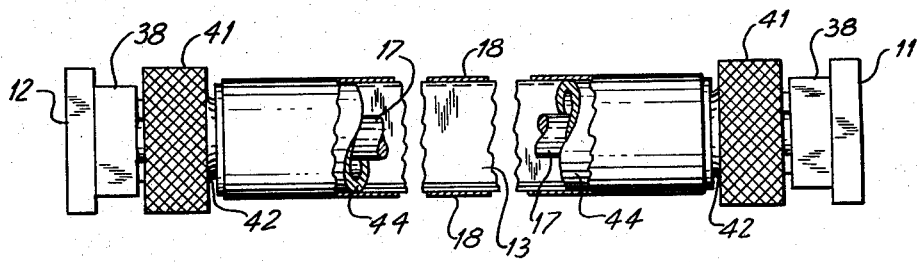
Figure 3 is an enlarged fragmentary end view, partly in section, showing the structural details of one of the end idler rollers.

It will be noted that the member 13, as best shown in Figure 2, is made of a single piece of material, bent to form a substantially flat box. The opposite ends of the material overlapping adjacent the end supporting the shaft 16, as best shown at 46. The large surface area comprising the top and bottom of the box 13 forms a supporting platform for the belt 16 in substantially a horizontal plane between the spaced end supporting rollers 28 and 44.

The finished trays or screens are of a size to be used interchangeably with other conventional trays or screens. It will be noted that their construction is such that they will have no top or bottom position since the opposite surfaces are identical. There is also no front or back end to these trays or screens since it will not matter which end is positioned forwardly on the conveyors.

The knurled wheels 24 and 41 are mounted adjacent the four corners of the tray or screen 10 on opposite ends of each of the shafts 16 and 17. These wheels 24 and 41, when traveling along a conventional conveyor, have no special significance and will not operate. However, where it is desirable to unload the products positioned thereon automatically as the tray travels on a conveyor, it is only necessary to provide a suitable camming bar member (not shown) in line with one or more of said wheels on either or both sides of the conveyor.

As the trays or screens 10 move along the conveyor, the knurled wheels will strike said operating camming bar member, which will cause them to rotate upon frictional contact therewith, thereby rotating their respective shafts, moving the belt 18 rearwardly and dropping the products mounted thereon over the trailing edge of the tray into a cooking vessel, onto another conveyor or into a container, as desired.

There is shown diagrammatically in Figure 6 the use of the tray or screen 10 of the present invention in a baker's continuous operation for making yeast raised doughnuts. In this illustration, the trays or screens 10 are carried along a conveyor 50, having space rail members 51. The conveyor 50 operates intermittently to permit the depositing of raw dough forms 52 on the belt 18 of the tray 10 as it passes under a conventional dough former 53. The loaded trays 10 then pass through a conventional proofing chamber 54, and, upon leaving the proofing chamber 54, the proof-raised dough forms 56 are ready to be deposited automatically into a cooking vessel 57, containing hot cooking oil 58. The automatic dumping of the proofed forms 56 from the belt 18 of the tray 10 is brought about through the frictional engagement of a reciprocating camming bar 61 with one of the knurled rollers 41 of the tray 10, as will be hereinafter more completely described.

When a tray 10 leaves the proofing chamber 54, it is moved by a second conveyor 62, which has spaced conventional indexing lugs 63 for controlling the movement and positioning of the trays 10 therealong. The tray 10 is at rest as soon as it is moved up to the camming bar 61, which is operable in timed sequence by means of a conventional air motor 66, having a horizontally extending piston 67, which, in turn, has spaced brackets 68 and 69 secured fixedly thereto. The camming bar 61 is mounted fixedly on the lower ends of said brackets 68 and 69, and extends horizontally in a plane adapted to engage the upper surface of a knurled roller 41 of the tray 10. The lower face of the camming bar 61 has an inlaid surface 71, such as hard rubber, which will give excellent frictional contact with the knurled roller 41 and eliminate any chance for slippage between the two moving members. It will be obvious that the length of the stroke of the piston 67 of the air motor 66 and the length of the camming bar 61 must be greater than the distance between centers of the shafts 16 and 17 of a tray 10 to insure movement of its belt 18 at least a distance equal thereto in order to complete the removal of any proofed forms 56 thereon.

Referring now to Figure 8, view A, when the camming bar 61 is actuated by the air motor 66 through its piston 67, the lower face 71 thereof contacts the upper surface of the knurled roller 41, thereby rotating said roller 41, which in turn drives said belt 18 backwardly to discharge its proofed dough forms 56 over the back or trailing end of the tray 10. In view B of Figure 8, it will be noted that when the piston 67 has reached the end of its forward stroke, the forward end of the camming bar 61 has been moved into a position beyond the rear shaft 17 of the tray 10. The discharged proofed dough forms 56 will fall onto a third conveyor 83, whereby they are carried over the cooking vessel 57 and discharged into the hot cooking oil 58.

The emptied trays or screens 10 are then moved by the lugs 63 forwardly and are eventually returned for reloading under the dough former 53.

Obviously, when a knurled wheel is turned, or is turned in the event there are duplicate camming bar mechanisms on opposite sides of the conveyor, the products contained on the top surface of the belt will be unloaded. In many instances, the trailing knurled wheel will also engage said camming mechanism and operate the belt a second time, but it is of no importance since there are no products then on said belt and the movement is meaningless.

Although I have only described in detail and illustrated in the drawings, but one form which the invention may assume, it will be readily apparent to those skilled in the art that the same need not be so limited but that various modifications may be made therein without departing from the spirit thereof.

The expression "two-way reversible" tray is used to indicate that the trays may be reversed end-to-end or turned over from top to bottom. In other words, the tray has no top or bottom or front or back.

What I claim is:

1. A portable and two-way reversible baker's tray or screen comprising a rectangular frame, a pair of spaced shafts journalled in said frame, said shafts having rollers mounted intermediate their ends, an endless belt encircling said rollers, and a roller cam mounted fixedly on each of said shafts between the ends of said rollers and said frame for engaging a camming means for rotating said shafts.

2. A portable and two-way reversible tray or screen for bakers comprising a rectangular frame, a pair of longitudinally spaced transversely extending shafts journalled in said frame adjacent each end thereof, each of said shafts having a roller mounted intermediate its ends, an endless belt encircling said rollers, and each of said shafts having spaced roller cams mounted between the side edges of said belt and said frame for engaging a camming surface for rotating said belt.

3. A portable and two-way reversible baker's tray or screen comprising a rectangular frame, a pair of longitudinally spaced transversely extending shafts journalled in said frame adjacent each end thereof, each of said shafts having a roller mounted intermediate its ends, an endless belt encircling said rollers, and each of said shafts having spaced camming means in the form of a wheel larger than said rollers mounted between the side edges of said belt and said frame for engaging a camming surface for rotating said belt, and means for maintaining said belt in a taut position over said spaced rollers.

References Cited in the file of this patent

UNITED STATES PATENTS

| | | |
|---|---|---|
| 763,779 | McManus | June 28, 1904 |
| 1,521,820 | Lloyd | Jan. 6, 1925 |
| 2,323,174 | Wikle | June 29, 1943 |
| 2,468,055 | Gibler | Apr. 26, 1949 |
| 2,659,476 | Koerber | Nov. 17, 1953 |
| 2,743,829 | Ballard | May 1, 1956 |

FOREIGN PATENTS

| | | |
|---|---|---|
| 525,903 | Belgium | Feb. 15, 1954 |